May 17, 1927.

R. C. ORREN 1,628,994

RAKE

Filed Nov. 12, 1924

INVENTOR
BY Robert C. Orren
Merrill M. Blackburn
ATTORNEY

Patented May 17, 1927.

1,628,994

UNITED STATES PATENT OFFICE.

ROBERT CARL ORREN, OF MOLINE, ILLINOIS.

RAKE.

Application filed November 12, 1924. Serial No. 749,535.

My invention relates more particularly to hand rakes, either wheeled or without wheels, and is concerned more especially with the structure whereby the teeth are resiliently mounted so that the rake will automatically conform itself to the shape of the surface over which it is being moved. Among the objects of my invention are to produce a simple and cheap rake of the character described, and yet such as will be durable and efficient in operation; to produce a rake of the character described which will easily and automatically adjust itself to the shape of the surface over which it is being moved; to produce a rake of the character referred to which will be easily assembled; to produce a rake which can be easily cleaned by moving the rake backwardly upon the ground, in event leaves or other substances should get lodged upon the teeth; and such further objects, advantages and capabilities as will later more fully appear and as are inherent in the construction disclosed.

Figure 1:
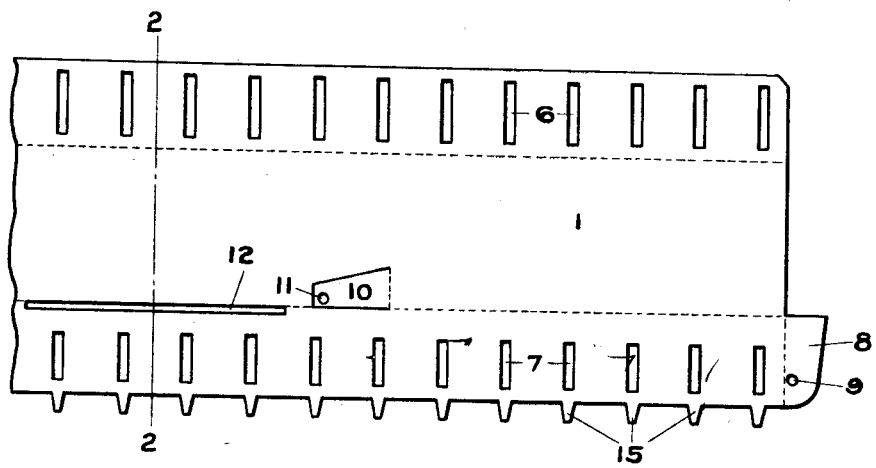
Figure 2:
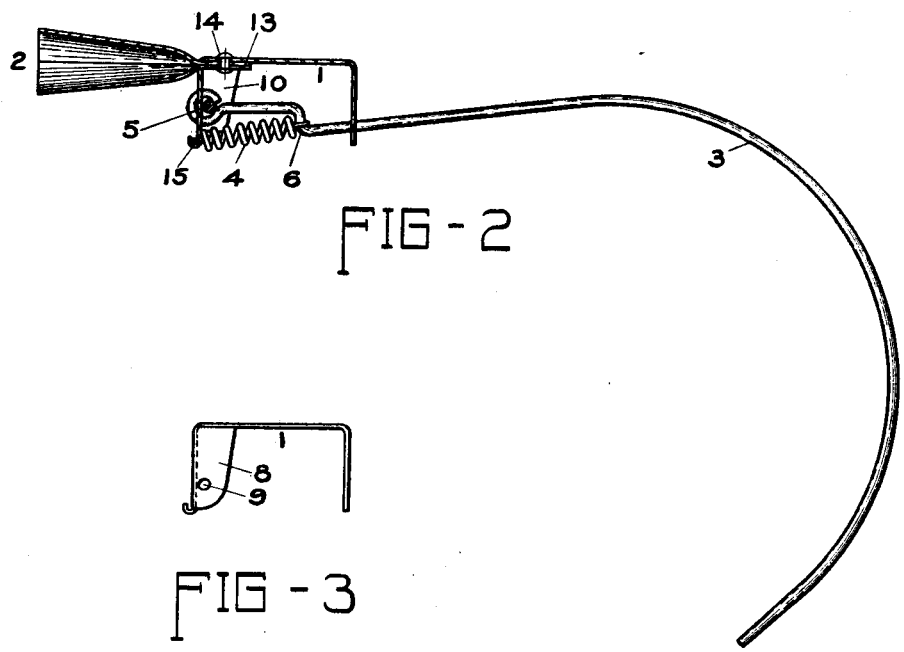
Figure 3:
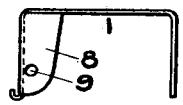

My invention further resides in the combination, construction and arrangement of parts illustrated in the accompanying drawing and, while I have shown therein a preferred embodiment of my invention I desire the same to be understood as illustrative only and not as limiting said invention. In the drawing annexed and forming a part hereof, Fig. 1 is a plan view of a portion of a blank from which the rake head is made; Fig. 2 is a transverse section substantially along the plane indicated by the line 2—2 Fig. 1; Fig. 3 is an end elevation of the rake head, without handle socket, teeth or springs.

Referring more in detail to the annexed drawing, the rake comprises a head 1, handle socket 2, a series of rake teeth 3 and a corresponding series of springs 4, the rake teeth being pivoted upon a rod 5 extending longitudinally of the head. In Fig. 1 is shown the blank from which the head 1 is formed, the same being stamped from a piece of sheet metal and having along one of its longitudinal edges a series of transverse slots 6 and along its other longitudinal edge a corresponding series of transverse slots 7. At each end the blank is provided with an ear 8 perforated at 9 for the reception of the rod 5. These ears, in shaping the head from the blank are bent in substantially at right angles to the major portion of the head, the fold line being indicated by a dotted line in Fig. 1. Dotted lines extending parallel with the longitudinal edges indicate fold lines along which the sheet metal is bent to produce the channel shaped head shown in Figs. 2 and 3. Ears 10, perforated at 11 are cut out of the top of the head as shown in Fig. 1 and folded down as indicated by the dotted line in this figure. There are one or more of these ears upon each side of the middle line 2—2 Fig. 1, the present drawing indicating only one. This arrangement results in the perforations 9 and 11 being aligned on the inside of the head so that the rod 5 may be easily inserted through these openings as the teeth are put in place and the rod shoved in to hold them in assembled relation.

In the rear vertical flange of the channel shaped head is a slot 12 for the reception of the attaching end 13 of the handle socket 2, the latter being preferably formed from two pieces of sheet metal stamped and bent into shape and then spot welded along their edges to secure them together. By preference the handle socket is fastened in place by means of rivets 14, though it will be understood that it may be secured by spot welding, if desired. When the teeth have been inserted in the head and the rod 5 put in to hold them there, springs 4 have one end secured to the hooks 15 and the other end secured to the bent portion 16 of the rake teeth. This arrangement makes it possible for the spring to resiliently hold the tooth in one limit of its path of travel and yet, by very slight yielding, to permit it to move to the other limit of its course of travel. This is believed preferable to having a small rod bent around the tooth near the forward wall of the channel shaped head and then inserted through a perforation in the top of the head. In this arrangement the spring surrounds the rod and presses at one end against the rake tooth and at its opposite end against the inside of the rake head. This arrangement makes it necessary for a greater amount of compression of the spring than the elongation which is necessary in the present construction.

The pivot rod 5 may be held in place in the head 1 either by means of nuts secured to its ends, or by means of cotter pins inserted through perforations in these ends.

If it is desired to provide this rake with wheels, it is only necessary to have a somewhat longer rod 5 so that the wheels may be mounted on the ends thereof and have washers placed outside of them and then the cotter pins inserted through openings in the ends of the rod to hold all the parts in assembled relation.

Rakes constructed in accordance with the present disclosure are made in various sizes, preferably not smaller than 20", and vary from that to 60". It is preferred to mount the large sizes upon wheels in order to make the operation easier.

By means of the rake described large areas can be raked in a small space of time and the rake will press substantially uniformly upon the surface being raked, even though that surface may be somewhat irregular. It will also be seen from the foregoing disclosure that I have provided a rake which is easy to manufacture and assemble, inexpensive in construction and very efficient in operation. It is, of course, understood that the specific description of structure set forth above may be departed from without departing from the spirit of my invention.

Having now described my invention, I claim:

1. A blank for a rake head comprising an elongated piece of sheet metal provided along its longitudinal edges with spaced transverse slots for the reception of rake teeth, when the rake is completed, and provided at intervals throughout its length with perforated ears, adapted, when the blank is bent into shape, to receive a rod for pivotally supporting rake teeth.

2. A blank for a rake head comprising an elongated piece of sheet metal provided along its longitudinal edges with spaced transverse slots for the reception of rake teeth, when the rake is completed, and provided at intervals through its length with perforated ears, adapted, when the blank is bent into shape, to receive a rod for pivotally supporting rake teeth, said blank being provided along one of its longitudinal edges with spaced projections, adapted to be bent into hooks to receive one end of each of a series of springs designed to resiliently actuate the rake teeth.

3. In a rake, a folded sheet metal head of channel shape having oppositely arranged slots in the sides of the channel, supporting means within the channel to support a pivot rod, a rod supported thereby, and teeth pivoted on the rod and extending through the pairs of oppositely arranged slots.

4. In a rake, a folded sheet metal head of channel shape having oppositely arranged slots in the sides of the channel, supporting means within the channel to support a pivot rod, a rod supported thereby, and teeth pivoted on the rod and extending through the pairs of oppositely arranged slots, in combination with resilient means to normally retain the rake teeth at one limit of their path of travel in the slots.

5. In a rake, a folded sheet metal head of channel shape having oppositely arranged slots in the sides of the channel, supporting means connected with the head and adapted to support a pivot rod, a rod supported thereby, and teeth pivoted on the rod and extending through the pairs of oppositely arranged slots.

6. In a rake, a folded sheet metal head of channel shape, having oppositely arranged transverse slots in the sides of the channel, curved resilient teeth extending through pairs of oppositely arranged slots and resiliently mounted therein, the slots in the head being, in length, several times the diameter of the material of the teeth, and means for securing said teeth in position in said slots and normally against one end of one slot of each pair.

In witness whereof, I hereunto subscribe my name to this specification.

ROBERT CARL ORREN.